United States Patent [19]

Wilkinson

[11]  4,422,904
[45]  Dec. 27, 1983

[54] METHOD FOR FORMING VIDEO DISCS
[75] Inventor: Richard L. Wilkinson, El Toro, Calif.
[73] Assignee: Discovision Associates, Costa Mesa, Calif.
[21] Appl. No.: 429,352
[22] Filed: Sep. 30, 1982

Related U.S. Application Data

[62] Division of Ser. No. 329,800, Dec. 11, 1981, abandoned.

[51] Int. Cl.³ ............................................... C25D 1/10
[52] U.S. Cl. ........................................ 204/5; 204/38 B
[58] Field of Search ................................... 204/5, 38 B

[56] References Cited

U.S. PATENT DOCUMENTS 2,530,842  11/1950  Ruggieri ............................. 204/5
4,211,617  7/1980  Hunyar ............................... 204/5

Primary Examiner—T. M. Tufariello
Attorney, Agent, or Firm—Ronald J. Clark

[57] ABSTRACT

An improved process for making video discs, which enables the molding of replicas having substantially higher signal-to-noise ratios during playback. One aspect of the invention extends the duration of a photoresist development process to yield developed recording masters having spaced information-bearing pits with unexpectedly steeper sidewalls. Another aspect of the invention forms metallic stampers using an initial vapor deposition step carried out in an extremely low pressure of about $1 \times 10^{-6}$ torr, to reduce oxidation and thereby improve conformity between the photoresist geometry and the stamper geometry.

1 Claim, 6 Drawing Figures

METHOD FOR FORMING VIDEO DISCS

This application is a division of application Ser. No. 329,800, filed Dec. 11, 1981.

BACKGROUND OF THE INVENTION

This invention relates generally to methods for forming video discs, and, more particularly, to methods for producing video disc masters and stampers used in forming video disc replicas.

Optically-readable video disc replicas are useful in storing vast quantities of information, usually in the form of a frequency-modulated (fm) video signal, with a high recording density. The fm signal is typically stored in a surface of the replica as a sequence of spaced pits or bumps arranged in a succession or substantially circular and concentric recording tracks. Each pit and adjacent space between pits represent one cycle of the fm signal.

A recording master typically includes a glass substrate having a disc-shaped, planar surface, with a thin photoresist recording layer overlaying it. Information is recorded in the recording layer by focusing an intensity-modulated writing beam of light onto the layer using a radially-movable objective lens, as the master is rotated at a prescribed rate. The intensity of the beam is modulated in accordance with the fm signal such that it is alternately greater than and less than a predetermined threshold at which photoresist is exposed.

Developing the exposed photoresist recording layer produces a sequence of spaced pits arranged in a succession of circular and concentric recording tracks. In one known previous developing technique, a number of different solutions were dispensed onto the layer as it was rotated at a relatively low velocity of about 75 to 100 rpm. First water was dispensed to pre-wet the layer, then both water and developer solution were dispensed for a duration of about 5 to 10 seconds to partially develop the layer, and finally developer solution alone was dispensed for a duration of about 20 seconds to fully develop the layer. The developed photoresist layer was rinsed with water to eliminate residual developer solution, and the rinsed layer was then dried by rotating it at a relatively high velocity of about 750 to 1000 rpm. The photoresist layer was preferably derived from Shipley AZ 1350 photoresist, and the developer solution was an inorganic alkali such as potassium hydroxide, sodium hydroxide, or trisodium phosphate. The developer solution was preferably AZ developer solution, which is believed to be principally trisodium phosphate, having a normality of about 0.230 to 0.240.

Disc-shaped stampers, for use in injection molding video disc replicas, are derived from the developed recording masters. In one known prior technique for making such stampers, a first metallic film having a uniform thickness of about 500 to 600 Å was vapor deposited onto the developed recording layer, in a chamber pressure of about $1 \times 10^{-5}$ torr. A second metallic film was thereafter electroplated onto the first film, and the two films together formed an integral metallic layer that could be separated from the underlying master recording. Residual photoresist material was removed from its undersurface using a suitable solvent, to form the stamper. Both films were preferably formed of nickel.

Although the methods described above have proven generally satisfactory as a part of an overall method of making video disc replicas, these replicas sometimes provide playback signal-to-noise ratios that are lower than believed possible. The microscopic structures of these replicas are believed to differ somewhat from an ideal sequence of sharply defined pits. There is thus a need for improved methods for making video discs having microscopic structures that conform better to an ideal sequence of sharply defined pits and thereby provide improved playback signal-to-noise ratios. The present invention fulfills this need.

SUMMARY OF THE INVENTION

The present invention resides in methods employed in the manufacture of video disc masters of a type having a photoresist recording layer, and in methods for producing stampers for such masters. The master includes a glass substrate with a smooth, planar surface on which a thin, uniform recording layer of photoresist is deposited. An information signal is recorded in the photoresist recording layer using an intensity-modulated writing beam of light, which produces a succession of spaced exposed regions arranged in a succession of substantially circular and concentric recording tracks.

The exposed photoresist recording layer is developed by dispensing a prescribed developer solution onto the layer for a prescribed duration, while the master is rotating at a relatively low velocity. After rinsing and drying, the photoresist layer includes a sequence of sharply defined pits wherever it had been exposed. The photoresist layer is preferably derived from Shipley AZ 1350 photoresist, and the developer solution is preferably an inorganic alkali such as potassium hydroxide, sodium hydroxide, or trisodium phosphate.

In accordance with one aspect of the invention, the developer solution has a normality of about 0.14 to 0.16, and it is dispensed onto the photoresist recording layer for a duration of more than about 40 seconds, preferably 60 seconds. This develops the recording layer at a rate substantially slower than known prior techniques, and has been found to provide a better ratio between desired dissolution of exposed photoresist material and undesired dissolution of unexposed photoresist material. Video discs formed from recording masters developed in this fashion provide significantly higher signal-to-noise ratios than known prior discs.

A disc-shaped stamper, suitable for use in injection molding video disc replicas, is derived from the developed photoresist recording layer. A first thin, uniform metallic film is vapor deposited onto the developed recording layer, after which a second thin, uniform metallic film is electroplated onto the first film. The two films together form an integral metallic layer that can be separated from the underlying master recording.

In accordance with another aspect of the present invention, the first metallic film is vapor deposited in a pressure of about $1 \times 10^{-6}$ torr or less. This pressure is substantially lower than that which was previously thought to be necessary for forming stampers. It significantly reduces oxidation of the metallic material, which unexpectedly caused the stampers to have microscopic structures that deviated from the precise photoresist geometry. This reduction in pressure therefore enables the molding of replicas exhibiting a significantly higher signal-to-noise ratio during playback.

Other aspects and advantages of the invention will become apparent from the following detailed description, taken in conjunction with the accompanying drawings, which illustrate, by way of example, the principles of the invention.

DETAILED DESCRIPTION

Figure 1:
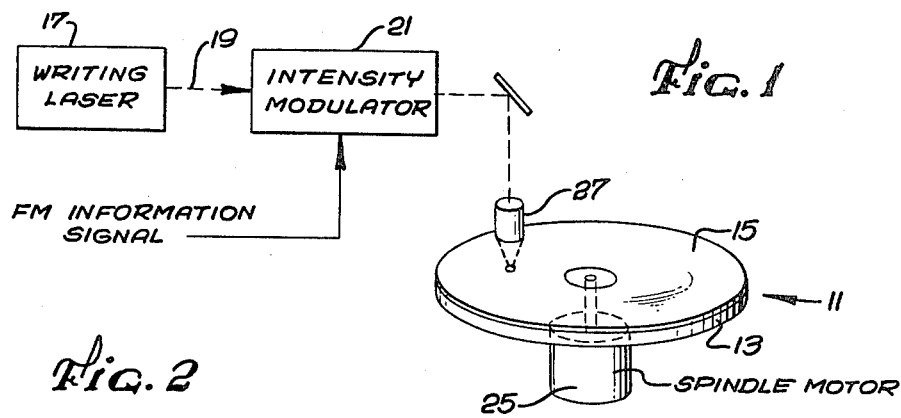
FIG. 1 is a simplified schematic diagram of apparatus for recording an fm information signal on a video disc recording master having a photoresist recording layer.

Referring now to the drawings, and particularly to FIG. 1, there is shown an apparatus for recording an fm information signal on a video disc recording master 11. The master includes a glass substrate 13, with a smooth, planar upper surface on which is deposited a photoresist recording layer 15 having a uniform thickness of about 1150 to 1350 Å. The recording layer is exposed whenever impinged by a beam of light having an intensity that exceeds a predetermined recording threshold.

The recording apparatus includes a writing laser 17 for producing a writing beam of light 19 having a prescribed intensity, and an intensity modulator 21 for modulating the intensity of the writing beam in accordance with an fm information signal supplied on line 23. The recording apparatus further includes a spindle motor 25 for rotating the recording master 11 at a prescribed angular velocity, and an objective lens 27 for focusing the intensity-modulated beam onto the recording layer 15 of the rotating master 11. The objective lens is mounted on a carriage (not shown) that is radially movable with respect to the master, so that the focused beam traces a spiral pattern on the recording layer.

Figure 2:
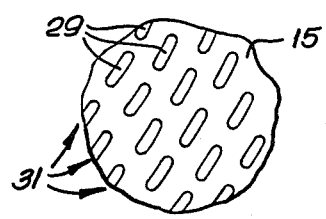
FIG. 2 is an enlarged plan view of a segment of the recording master of FIG. 1, after development, showing a succession of spaced pits arranged in a plurality of substantially circular and concentric recording tracks.
Figure 3:
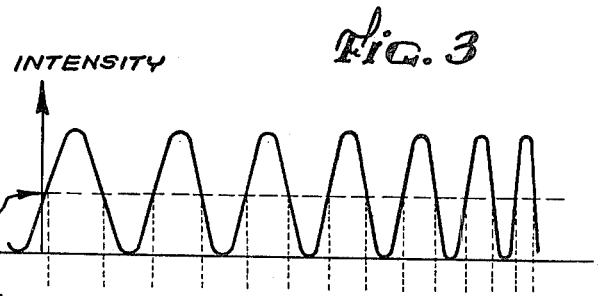
FIG. 3 is a graph showing the modulated intensity of the writing beam in the recording apparatus of FIG. 1.
Figure 4:
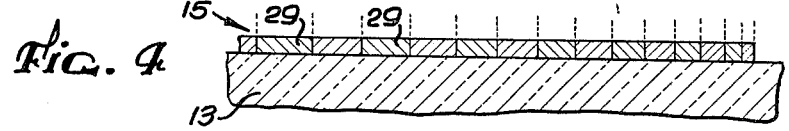
FIG. 4 is a sectional, elevational view of a portion of the recording master, taken along a recording track and showing the photoresist recording layer to be exposed whenever the intensity of the writing beam of FIG. 3 exceeds a predetermined recording threshold.
Figure 5:
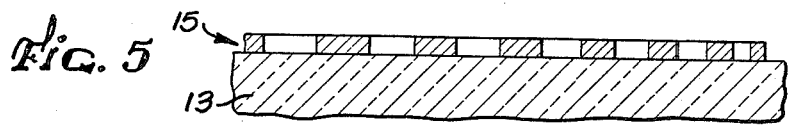
FIG. 5 is a sectional, elevational view of the recording master of FIG. 4, after development to remove the spaced, exposed regions.

As shown in FIGS. 3 and 4, the intensity of the intensity-modulated beam 19 is alternately greater than and less than the predetermined recording threshold of the photoresist recording layer 15. This produces a succession of spaced exposed regions 29 arranged in a plurality of substantially circular and concentric recording tracks 31 in the layer. Each exposed region and adjacent space correspond to one cycle of the fm signal. FIGS. 2 and 5 depict the recording master 11 after development to remove the exposed regions, the master then being in suitable condition for use in producing a stamper.

The recording master 11 is initially prepared for use with the recording apparatus of FIG. 1 using a special process in which the upper surface of the glass substrate 13 is first ground, polished and cleaned. The photoresist recording layer 15 is then formed by dispensing a photoresist solution onto the surface, as it is rotated at a velocity of about 75 to 100 rpm. The photoresist solution is preferably prepared by diluting Shipley AZ 1350 photoresist with Shipley AZ thinner, in a ratio of about 3 to 1. This provides a solution viscosity of about 1.3 centipoise. The specific viscosity and angular velocity are carefully selected to provide the layer with its prescribed, uniform thickness across its entire surface. After drying and baking, the recording master is in suitable condition for recording.

After the fm information signal is recorded in the photoresist recording layer 15 by the recording apparatus of FIG. 1, as described above, the exposed layer is developed using a special developing process. This converts each recording track into a succession of spaced pits of uniform depth and width and of continuously-variable length.

Figure 6:
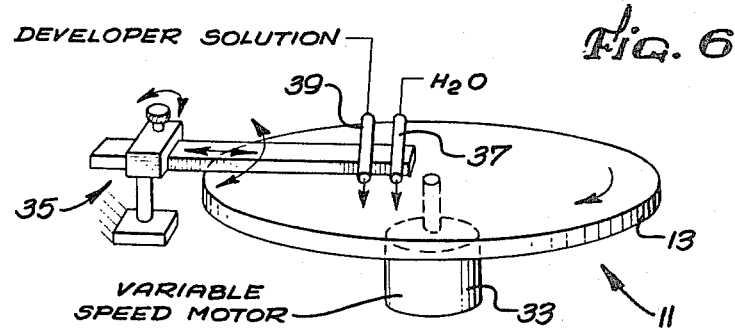
FIG. 6 is a perspective view of a turntable apparatus used in developing the photoresist recording layer exposed by the apparatus of FIG. 1.

In the developing process, the exposed recording master 11 is rotated by a turntable apparatus as shown in FIG. 6, and fluids are dispensed onto the rotating master in a prescribed fashion. The turntable apparatus includes a variable speed motor 33 for rotating the master at a selected velocity, and a pivot arm 35 carrying two dispensing tubes 37 and 39 for dispensing de-ionized water and developer solution, respectively, in a prescribed sequence. The de-ionized water preferably has a resistance exceeding about 18 mega-ohms per square centimeter. The developer solution is an inorganic alkali such as potassium hydroxide, sodium hydroxide or trisodium phosphate, preferably an AZ developer solution, which is believed to be principally trisodium phosphate.

As the motor 33 rotates the recording master 11 at about 75 to 100 rpm, water is first dispensed through the tube 37 to pre-wet the recording layer 15, after which both water and developer solution are dispensed through the tubes 37 and 39 for about 5 to 10 seconds to partially develop the layer. Developer solution alone is then dispensed through the tube 39 to fully develop the layer, and, finally, water is again dispensed through the tube 37 to rinse away residual developer solution. The motor speed is then increased to about 750 to 1000 rpm, to dry the developed recording layer.

In accordance with one aspect of the present invention, the AZ developer solution has a normality of only about 0.14 to to 0.16 and is dispensed onto the layer for a relatively long duration of about 60 seconds. This substantially slows down the development of the exposed photoresist recording layer 15 over known prior developing processes, including the development process recommended by the manufacturer of Shipley photoresist. A slower development has been found to provide pits having unexpectedly steeper sidewalls, which permits the eventual molding of disc replicas having higher signal-to-noise ratios during playback.

The next step in the video disc manufacturing process is to use the developed recording master 11 to produce a stamper suitable for use in molding video disc replicas. The stamper is produced by first vapor depositing a uniform metallic film of about 500 to 600 Å thickness onto the developed recording layer 15, and then electroplating a second uniform metallic film of about 15 mils thickness onto the first film. The undersurface of the first film conforms to the pattern of spaced pits formed in the photoresist layer, and the two films together form an integral metallic layer. This integral metallic layer can be separated from the underlying recording master and residual photoresist material removed using a suitable photoresist thinner, thereby forming the stamper. In the preferred embodiment, both metallic films are formed of nickel.

In accordance with another aspect of the present invention, the first metallic film is vapor deposited in a pressure of about $1 \times 10^{-6}$ torr or less. This pressure is an order of magnitude lower than that which was previously thought to be necessary for forming stampers. It significantly reduces oxidation of the deposited metallic material, which was found to be an unexpected source of microscopic deviations between the stamper geometry and the photoresist geometry. This reduction is pressure therefore enables the molding of replicas exhibiting a significantly higher signal-to-noise ratio during playback.

It should be appreciated from the foregoing description that the present invention provides improved methods for forming video discs, which result in disc replicas having substantially higher playback signal-to-noise ratios. One aspect of the invention provides a photoresist development process that yields developed recording masters having spaced information-bearing pits with unexpectedly steeper sidewalls. Another aspect of the invention forms metallic stampers using an initial vapor deposition step carried out in an extremely low pressure, to reduce oxidation and thereby unexpectedly improve conformity between the stamper geometry and the photoresist geometry.

Although the invention has been described in detail with reference to the presently preferred embodiments, it should be understood by one of ordinary skill in the art that various modifications can be made without departing from the spirit and scope of the invention. Accordingly, it is not intended that the invention be limited, except as by the appended claims.

I claim:

1. A method for forming a stamper for use in molding video disc replicas, comprising steps of:

forming a disc-shaped master recording that includes a glass substrate and a thin recording layer, an information signal being recorded in the recording layer in a sequence of spaced pits arranged in a plurality of substantially circular and concentric recording tracks;

vapor depositing a first thin, uniform, metallic film on the recording layer of the master recording, the vapor depositing occurring in a pressure of about $1 \times 10^{-6}$ torr or less;

electroplating a second thin, uniform, metallic film onto the first film, the first and second films together forming an integral, metallic layer;

separating the metallic layer from the underlying master recording; and removing residual recording layer material from the undersurface of the separated metallic layer, to form a stamper suitable for use in molding video disc replicas.

* * * * *